US012587116B2

(12) United States Patent
Chen

(10) Patent No.: US 12,587,116 B2
(45) Date of Patent: Mar. 24, 2026

(54) MOTOR STARTING CIRCUIT HAVING DEAD TIME SETTING MECHANISM

(71) Applicant: ANPEC ELECTRONICS CORPORATION, Hsinchu (TW)

(72) Inventor: Kun-Min Chen, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 209 days.

(21) Appl. No.: 18/443,241

(22) Filed: Feb. 15, 2024

(65) Prior Publication Data

US 2025/0183822 A1 Jun. 5, 2025

(30) Foreign Application Priority Data

Dec. 1, 2023 (TW) .................................. 112146706

(51) Int. Cl.
 *H02P 6/20* (2016.01)
 *H02P 6/15* (2016.01)
(52) U.S. Cl.
 CPC ..................................... *H02P 6/153* (2016.02)
(58) Field of Classification Search
 CPC .................................. H02P 6/153; H02P 6/20

USPC ....................................................... 318/400.14
See application file for complete search history.

(56) References Cited

U.S. PATENT DOCUMENTS

| | | | | |
|---|---|---|---|---|
| 5,264,769 | A * | 11/1993 | Itoh ...................... | G05B 19/232 |
| | | | | 318/696 |
| 8,912,744 | B2 * | 12/2014 | Chang ........................ | H02P 6/15 |
| | | | | 318/599 |
| 9,748,880 | B2 * | 8/2017 | Mizuo ........................ | H02P 6/15 |
| 2002/0003412 | A1 * | 1/2002 | Takayama ................. | H02P 6/20 |

* cited by examiner

*Primary Examiner* — Gabriel Agared
(74) *Attorney, Agent, or Firm* — Li & Cai Intellectual Property Office

(57) ABSTRACT

A motor starting circuit having a dead time setting mechanism is provided. The motor starting circuit includes a rotational speed detection circuit, a start-up commutation selector circuit, a control circuit, a driver circuit and an output stage circuit. The rotational speed detection circuit detects a rotational speed of a motor. The start-up commutation selector circuit determines whether or not to set a dead time within a motor start-up time interval to output a commutation instructing signal according to the rotational speed of the motor. The control circuit controls the driver circuit to drive the output stage circuit so as to start up the motor according to the commutation instructing signal.

16 Claims, 10 Drawing Sheets dead time dead time

Vout1c

Vout2c

FIG. 6

MOTOR STARTING CIRCUIT HAVING DEAD TIME SETTING MECHANISM

CROSS-REFERENCE TO RELATED PATENT APPLICATION

This application claims the benefit of priority to Taiwan Patent Application No. 112146706, filed on Dec. 1, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to motors, and more particularly to a motor starting circuit having a dead time setting mechanism.

BACKGROUND OF THE DISCLOSURE

Fan motors are often used in electronic devices to cool heat-generating components such as processors. During the process of cooling the heating element, it is necessary to obtain motor-related data in real time so that the fan motor can be started appropriately according to the data, thereby allowing the fan motor to exhibit an optimal cooling performance for properly cooling the heating element. However, the fan motor driven by a conventional motor starting circuit will continue to produce high noise, or generate a large back electromotive force current to flow back into the input voltage source of the traditional motor starting circuit, causing the input voltage source and the high-side switch of the power converter and other circuit components to burn out due to overvoltage.

SUMMARY OF THE DISCLOSURE

In response to the above-referenced technical inadequacies, the present disclosure provides a motor starting circuit having a dead time setting mechanism. The motor starting circuit includes a rotational speed detection circuit, a start-up commutation selector circuit, a control circuit, a driver circuit and an output stage circuit. The rotational speed detection circuit is connected to a motor and configured to detect a rotational speed of the motor to output a rotational speed detection signal. The start-up commutation selector circuit is connected to the rotational speed detection circuit and configured to determine whether or not there is a dead time within a motor start-up time interval to output a commutation instructing signal according to the rotational speed of the motor indicated by the rotational speed detection signal received from the rotational speed detection circuit. The control circuit is connected to the start-up commutation selector circuit and configured to output a control signal according to the commutation instructing signal received from the start-up commutation selector circuit. The driver circuit is connected to control circuit and configured to output a driving signal according to the control signal received from the control circuit. The output stage circuit is connected to the driver circuit and the motor and configured to start the motor according to the driving signal received from the driver circuit.

As mentioned above, the present disclosure provides a motor starting circuit having a dead time setting mechanism. The motor starting circuit of the present disclosure automatically detects the rotational speed of the motor, determines whether or not there is a dead time within a motor start-up time interval according to the rotational speed of the motor, and can set the dead time within the motor start-up time interval. In particular, when the motor is running at a high speed, the length of the dead time is set to be less than a dead time length threshold (for example, a zero value) to prevent the motor from having a dead time in the motor start-up time interval, during which a large back electromotive force current will be generated and fed back into the power supply.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6 is a waveform diagram of a motor starting circuit having a dead time setting mechanism according to the second embodiment of the present disclosure;

DETAILED DESCRIPTION OF THE EXEMPLARY EMBODIMENTS

Figure 1:
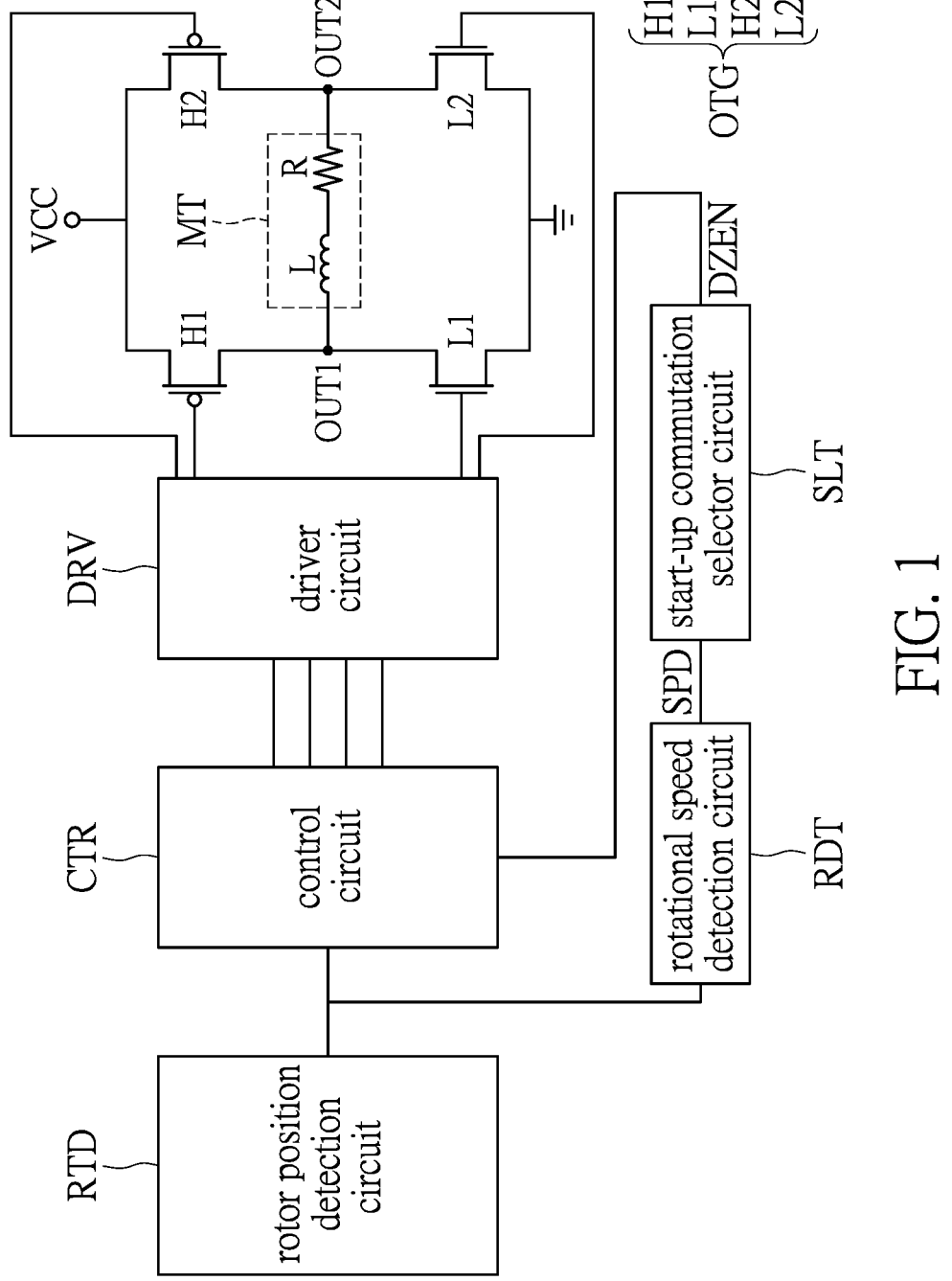
FIG. 1 is a circuit diagram of a motor starting circuit having a dead time setting mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a motor starting circuit having a dead time setting mechanism according to a first embodiment of the present disclosure.

In the first embodiment, the motor starting circuit of the present disclosure includes a control circuit CTR, a driver circuit DRV, an output stage circuit OTG, a rotational speed detection circuit SDT and a start-up commutation selector circuit SLT. If necessary, the motor starting circuit of the present disclosure may further include a rotor position detection circuit RTD.

The control circuit CTR is connected to the driver circuit DRV. The driver circuit DRV is connected to the output stage circuit OTG. The output stage circuit OTG is connected to the motor MT.

In the first embodiment of the present disclosure, the motor MT used to drive the motor starting circuit of the present disclosure is a single-phase motor, but the present disclosure is not limited thereto.

The output stage circuit OTG of the motor starting circuit of the present disclosure may include a plurality of high-side switches and a plurality of low-side switches. The plurality of high-side switches and the plurality of low-side switches included in the output stage circuit OTG can be any type of transistors. In the first and second embodiments of the present disclosure, the motor MT used in the motor starting circuit of the present disclosure is a single-phase motor, and the output stage circuit OTG includes a first high-side switch H1, a first low-side switch L1, a second high-side switch H2 and a second low-side switch L2.

A first terminal of the first high-side switch H1 is connected to a common power supply to receive a common voltage VCC from the common power supply. A first terminal of the first low-side switch L1 is connected to a second terminal of the first high-side switch H1. A second terminal of the first low-side switch L1 is grounded. A node between a first terminal of the first low-side switch L1 and a second terminal of the first high-side switch H1 is connected to a first terminal OUT1 of the motor MT.

A first terminal of the second high-side switch H2 is connected to the common power supply to receive the common voltage VCC from the common power supply. A first terminal of the second low-side switch L2 is connected to a second terminal of the second high-side switch H2. The second terminal of the second low-side switch L2 is grounded. A node between a first terminal of the second low-side switch L2 and the second terminal of the second high-side switch H2 is connected to a second terminal OUT2 of the motor MT.

A control terminal of the first high-side switch H1, a control terminal of the first low-side switch L1, a control terminal of the second high-side switch H2 and a control terminal of the second low-side switch L2 are connected to an output terminal of the driver circuit DRV. An input terminal of the driver circuit DRV is connected to an output terminal of the control circuit CTR.

If the dead time is not set within a motor start-up time interval, the current flowing through a coil L of the motor MT changes drastically, so that noise will be generated.

On the contrary, if there is a dead time within a motor start-up time interval, the current of the coil L of the motor MT changes relatively slowly during commutation and the noise is small.

However, if there is a dead time within a motor start-up time interval, the time point at which the motor MT delays commutation is incorrect, and a large current will be generated.

Assuming that a fan rotates after being turned on (for example, supply of the common voltage VCC continues after a momentary stop), the back electromotive force voltage of the motor MT is greater than the driving voltage of the motor MT and the back electromotive force voltage signal is commutated within the dead time while the voltage signals of the first terminal OUT1 and the second terminal OUT2 of the motor MT are not commutated yet, a large back electromotive force current is generated to flow back to the common voltage VCC, and the input voltage source and the output stage circuit OTG (the first high-side switch H1) of the motor starting circuit of the present disclosure and other circuit components will be burned out due to overvoltage.

It is worth noting that when the rotational speed of the motor MT is excessively high and the dead time is cancelled, there will be no back electromotive force current. Furthermore, when the rotational speed of the fan motor MT is excessively high, the starting noise of the motor MT will be masked by the cutting sound of the fan blades. Thus, there is no need to set a dead time to reduce the noise.

Therefore, the motor starting circuit of the present disclosure includes a rotational speed detection circuit SDT and a start-up commutation selector circuit SLT. An output terminal of the rotational speed detection circuit SDT is connected to an input terminal of the start-up commutation selector circuit SLT. The output terminal of the start-up commutation selector circuit SLT is connected to an input terminal of the control circuit CTR.

The rotational speed detection circuit SDT detects the rotational speed of the motor MT and outputs a rotational speed detection signal SPD to the start-up commutation selector circuit SLT.

If necessary, the rotational speed detection circuit SDT can be connected to the rotor position detection circuit RTD. The rotor position detection circuit RTD detects the position of the rotor of the motor MT to output a rotor position detection signal, and the rotational speed detection circuit SDT determines the change in the position of the rotor of the motor MT to determine the rotational speed of the motor MT for outputting the rotational speed detection signal SPD to the start-up commutation selector circuit SLT according to a rotor position detection signal received from the rotor position detection circuit RTD.

The start-up commutation selector circuit SLT determines whether or not there is a dead time within a motor start-up time interval according to the rotational speed of the motor MT indicated by a speed detection signal SPD received from the rotational speed detection circuit SDT, and can set the dead time of the motor start-up time interval and a time point and a time length of a motor commutation time to output a commutation instructing signal DZEN.

The start-up commutation selector circuit SLT can determine whether or not a dead time within a motor start-up time interval is less than a dead time length threshold (e.g. zero value) according to the rotational speed of the motor MT indicated by the rotational speed detection signal SPD received from the rotational speed detection circuit SDT.

The control circuit CTR outputs a plurality of control signals according to the commutation instructing signal DZEN received from the start-up commutation selector circuit SLT (and the rotor position detection signal received from the rotor position detection circuit RTD).

The driver circuit DRV outputs a plurality of driving signals to the control terminal of the first high-side switch H1, the control terminal of the first low-side switch L1, the control terminal of the second high-side switch H2 and the control terminal of the second low-side switch L2 of the output stage circuit OTG according to the plurality of control signals received from the control circuit CTR to control the operation of the output stage circuit OTG to start the motor MT.

Figure 2:
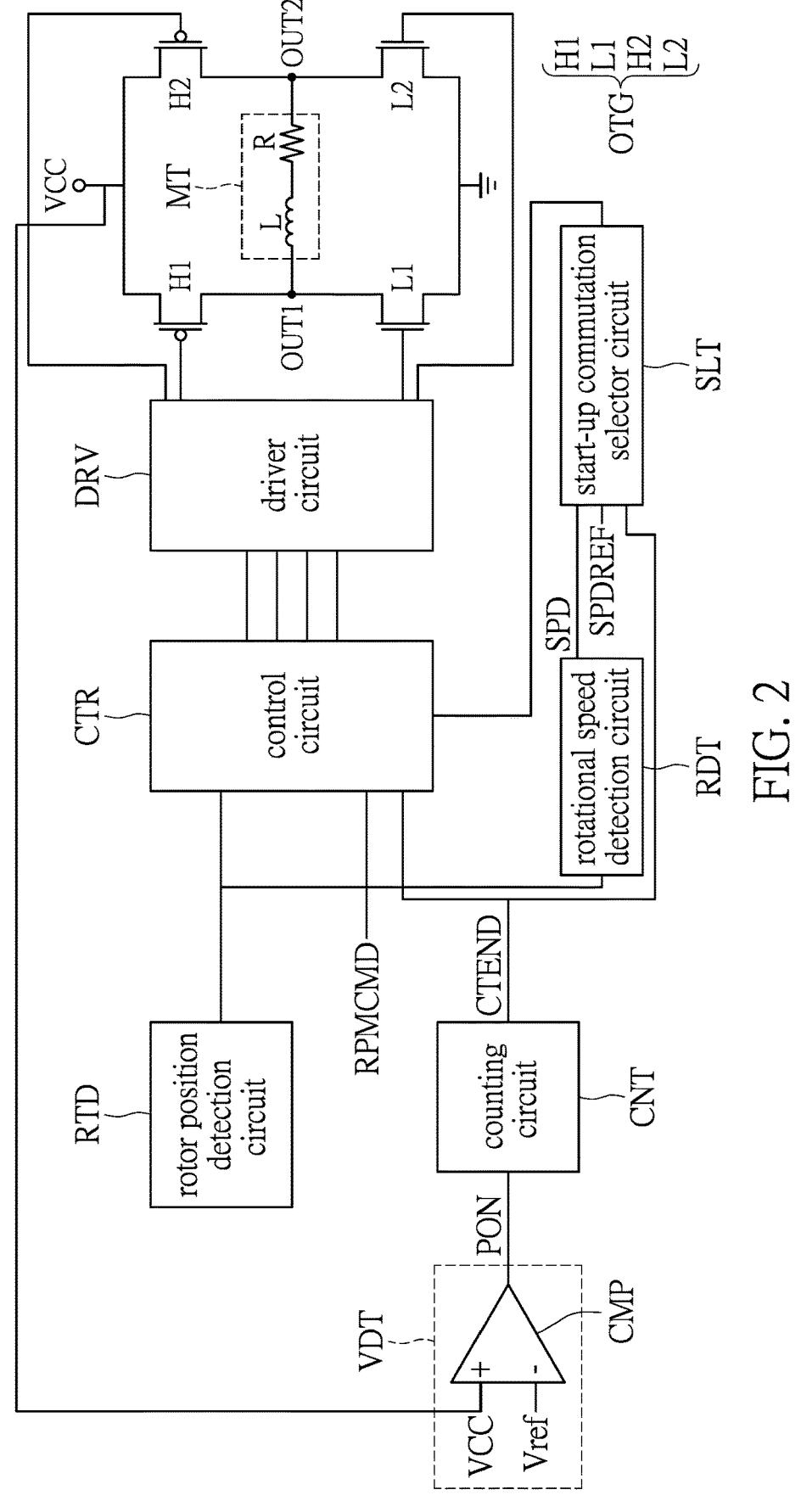
FIG. 2 is a circuit diagram of a motor starting circuit having a dead time setting mechanism according to a second embodiment of the present disclosure.
Figure 3:
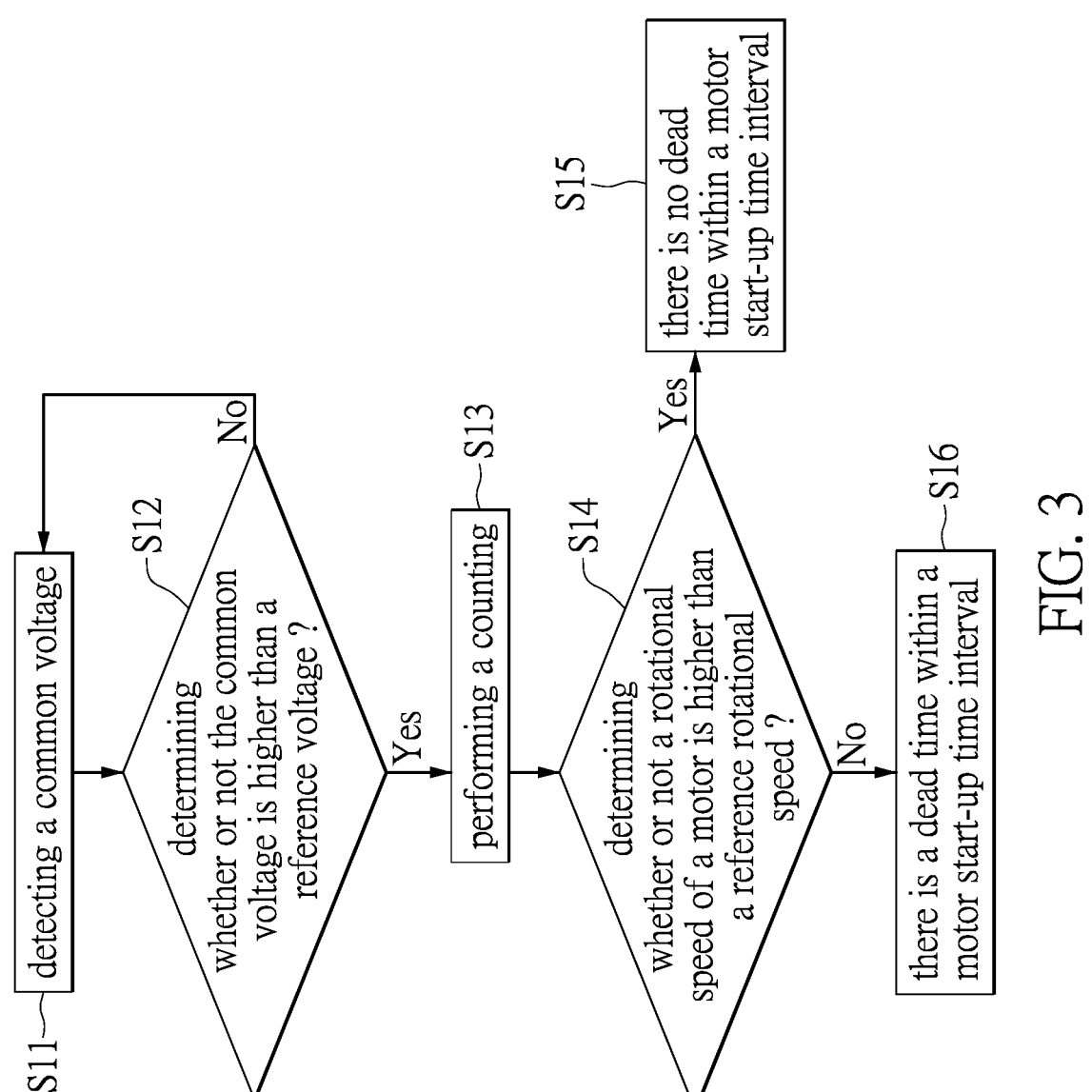
FIG. 3 is a flow chart of a motor starting circuit having a dead time setting mechanism according to the second embodiment of the present disclosure.

Reference is made to FIGS. 2 to 10. FIG. 2 is a circuit diagram of a motor starting circuit having a dead time setting mechanism according to a second embodiment of the present disclosure, FIG. 3 is a flow chart of a motor starting circuit having a dead time setting mechanism according to the second embodiment of the present disclosure, and FIGS. 4 to 10 are waveform diagrams of a motor starting circuit having a dead time setting mechanism according to the second embodiment of the present disclosure.

In the second embodiment, in addition to the rotational speed detection circuit SDT, the start-up commutation selector circuit SLT, the control circuit CTR, the driver circuit DRV, the output stage circuit OTG and the rotor position detection circuit RTD, the motor starting circuit of the present disclosure may further include a voltage detection circuit VDT and a counting circuit CNT.

The voltage detection circuit VDT is connected to the output stage circuit OTG, or is connected to a line between the output stage circuit OTG and the common power supply for supplying the common voltage VCC. As shown in FIG. 2, the voltage detection circuit VDT is connected to the first terminal of the first high-side switch H1 (the line between the common power supply for supplying the common voltage VCC), and is connected to the first terminal of the second high-side switch H2 (the line between the common power supply for supplying the common voltage VCC).

An input terminal of the counting circuit CNT is connected to the voltage detection circuit VDT. The output terminal of the counting circuit CNT is connected to the input terminal of the start-up commutation selector circuit SLT (and the control circuit CTR).

In the second embodiment of the present disclosure, when the common voltage VCC received from the common power supply by the output stage circuit OTG (the first terminal of the first high-side switch H1 and the first terminal of the second high-side switch H2) connected to the motor MT in the motor starting circuit gradually increases to a reference voltage Vref, the motor starting circuit of the present disclosure will obtain sufficient power to drive the motor MT, so that the rotational speed of the motor MT reaches the target rotational speed and the operation is stably maintained according to the target rotational speed.

Therefore, the voltage detection circuit VDT can detect the common voltage VCC received from the common power supply by the output stage circuit OTG (the first terminal of the first high-side switch H1 and the first terminal of the second high-side switch H2) (as shown in S11 of FIG. 3).

The voltage detection circuit VDT can determine whether or not the common voltage VCC received by a detected output stage circuit OTG (the first terminal of the first high-side switch H1 and the first terminal of the second high-side switch H2) from the common power supply is higher than the reference voltage Vref, so as to output a voltage detection signal PON to the counting circuit CNT (as shown in S12 of FIG. 3).

For example, as shown in FIG. 2, the voltage detection circuit VDT may include a comparator CMP. The first input terminal of the comparator CMP, for example, the non-inverting input terminal is connected to the first terminal of the first high-side switch H1 of the output stage circuit OTG (the line between the common power supply for supplying the common voltage VCC), or to the first terminal of the second high-side switch H2 (the line between the common power supply for supplying the common voltage VCC). The second input terminal of the comparator CMP, for example, the inverting input terminal, is coupled to the reference voltage Vref. An output terminal of the comparator CMP is connected to the input terminal of the counting circuit CNT.

The comparator CMP can compare the common voltage VCC received from the common power supply with the reference voltage Vref of the output stage circuit OTG (the first terminal of the first high-side switch H1 and the first terminal of the second high-side switch H2) to output the voltage detection signal PON to the counting circuit CNT.

Whenever the counting circuit CNT determines that the common voltage VCC received by the output stage circuit OTG (the first terminal of the first high-side switch H1 and the first terminal of the second high-side switch H2) from the common power supply is higher than the reference voltage Vref according to the voltage detection signal PON received from the voltage detection circuit VDT (the comparator CMP), the counting circuit CNT can, such as but not limited to, count up once, to output a counting signal CTEND (as shown in S13 of FIG. 3).

Figure 10:
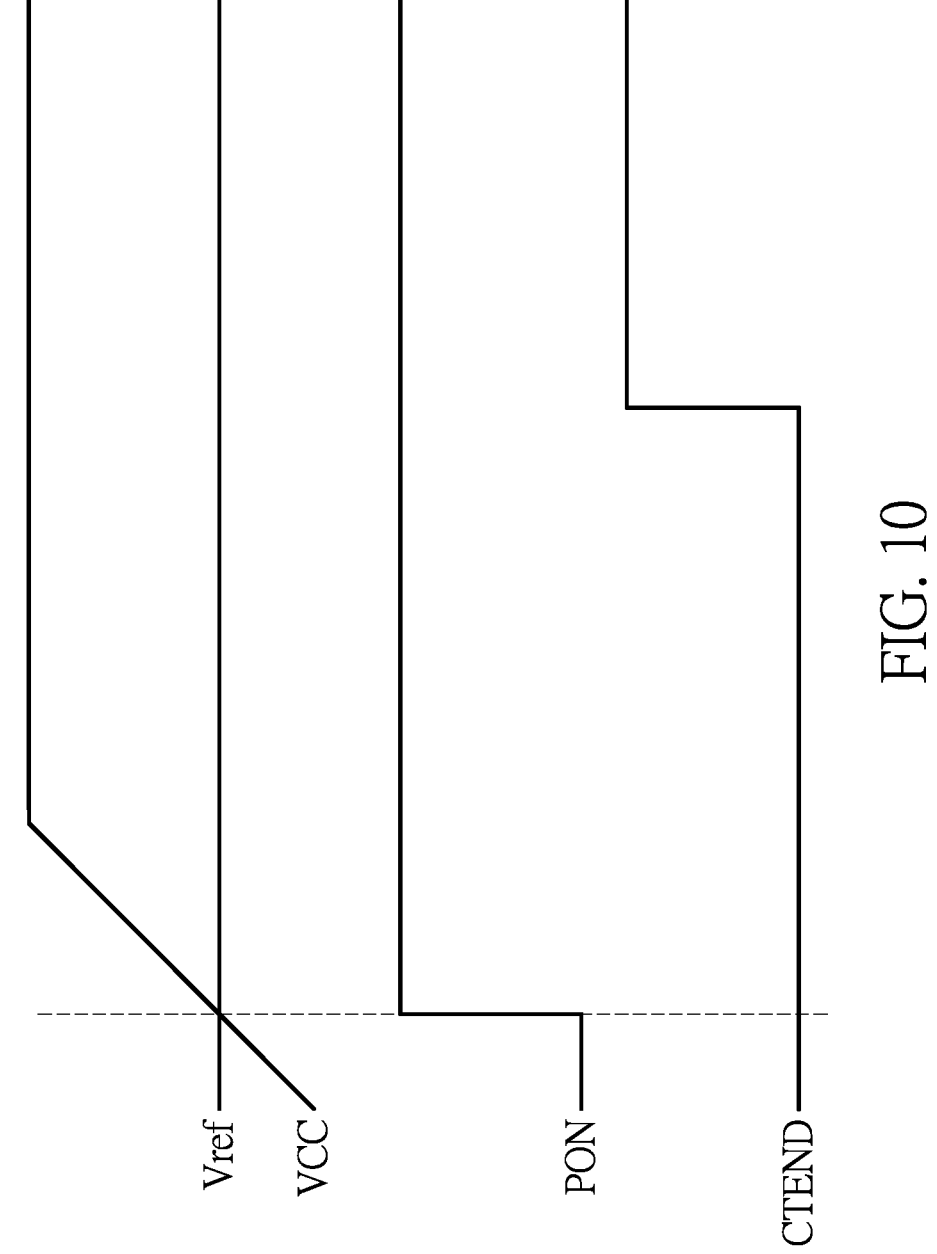
FIG. 10 is a waveform diagram of a motor starting circuit having a dead time setting mechanism according to the second embodiment of the present disclosure.

For example, as shown in FIG. 10, when the common voltage VCC received by the output stage circuit OTG (the first terminal of the first high-side switch H1 and the first terminal of the second high-side switch H2) from the common power supply is higher than the reference voltage Vref, the voltage detection circuit VDT (the comparator CMP) outputs a high-level voltage detection signal PON. Whenever the counting circuit CNT receives a high-level voltage detection signal PON from the voltage detection circuit VDT (the comparator CMP), it counts, for example but not limited to counting up once, to output a counting signal CTEND.

Figure 4:
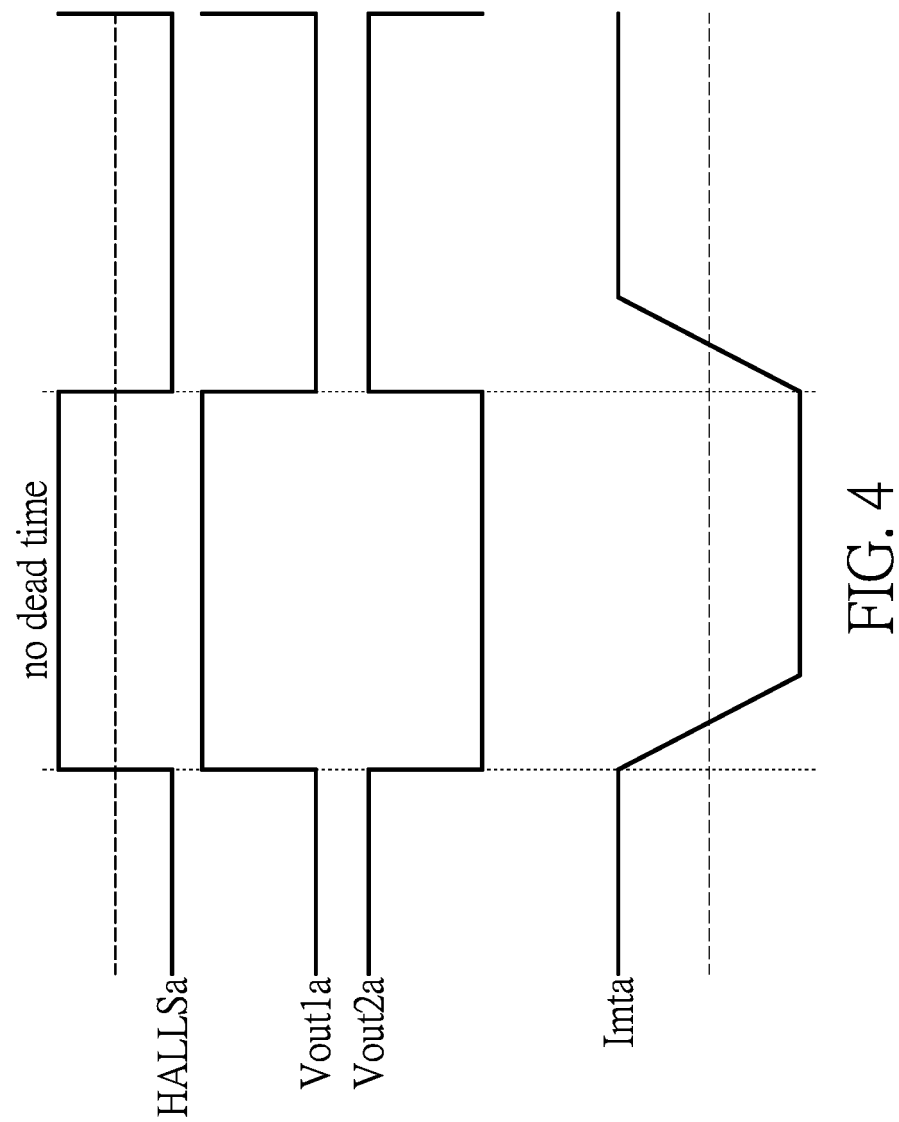
FIG. 4 is a waveform diagram of a motor starting circuit having a dead time setting mechanism according to the second embodiment of the present disclosure.
Figure 5:
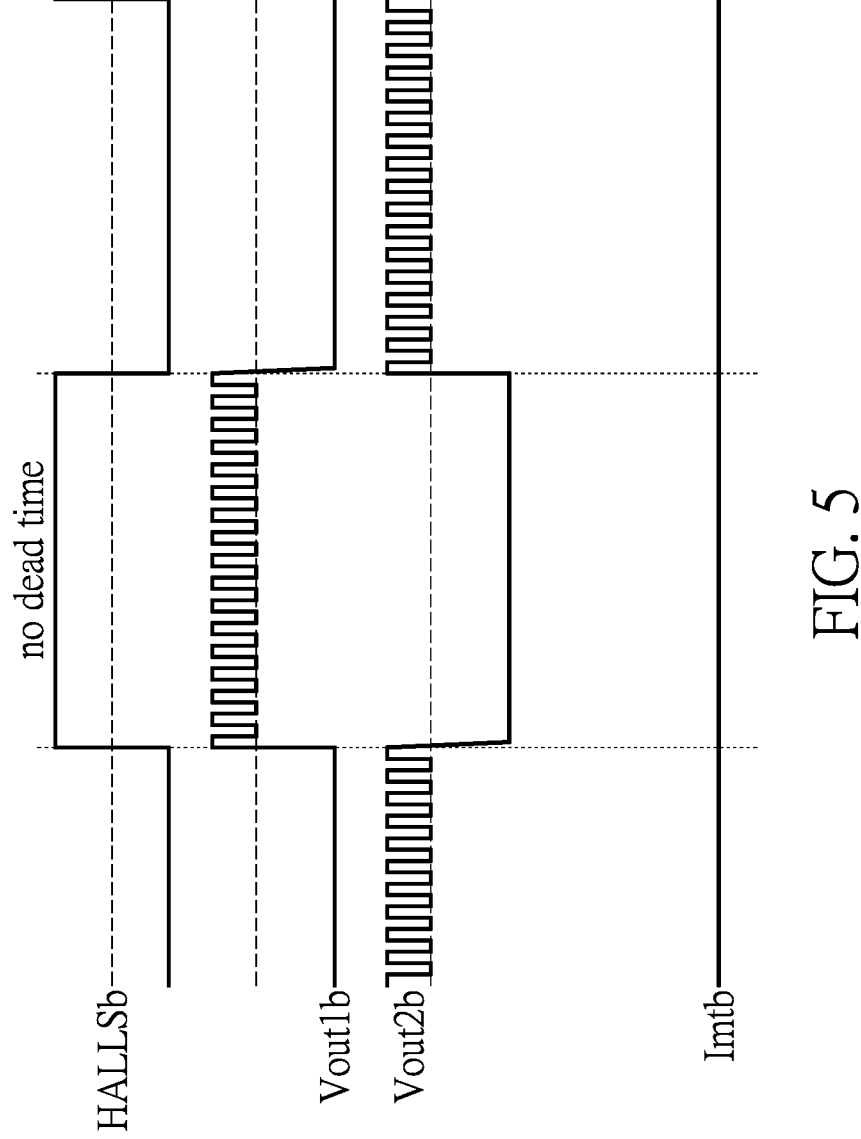
FIG. 5 is a waveform diagram of a motor starting circuit having a dead time setting mechanism according to the second embodiment of the present disclosure.
Figure 7:
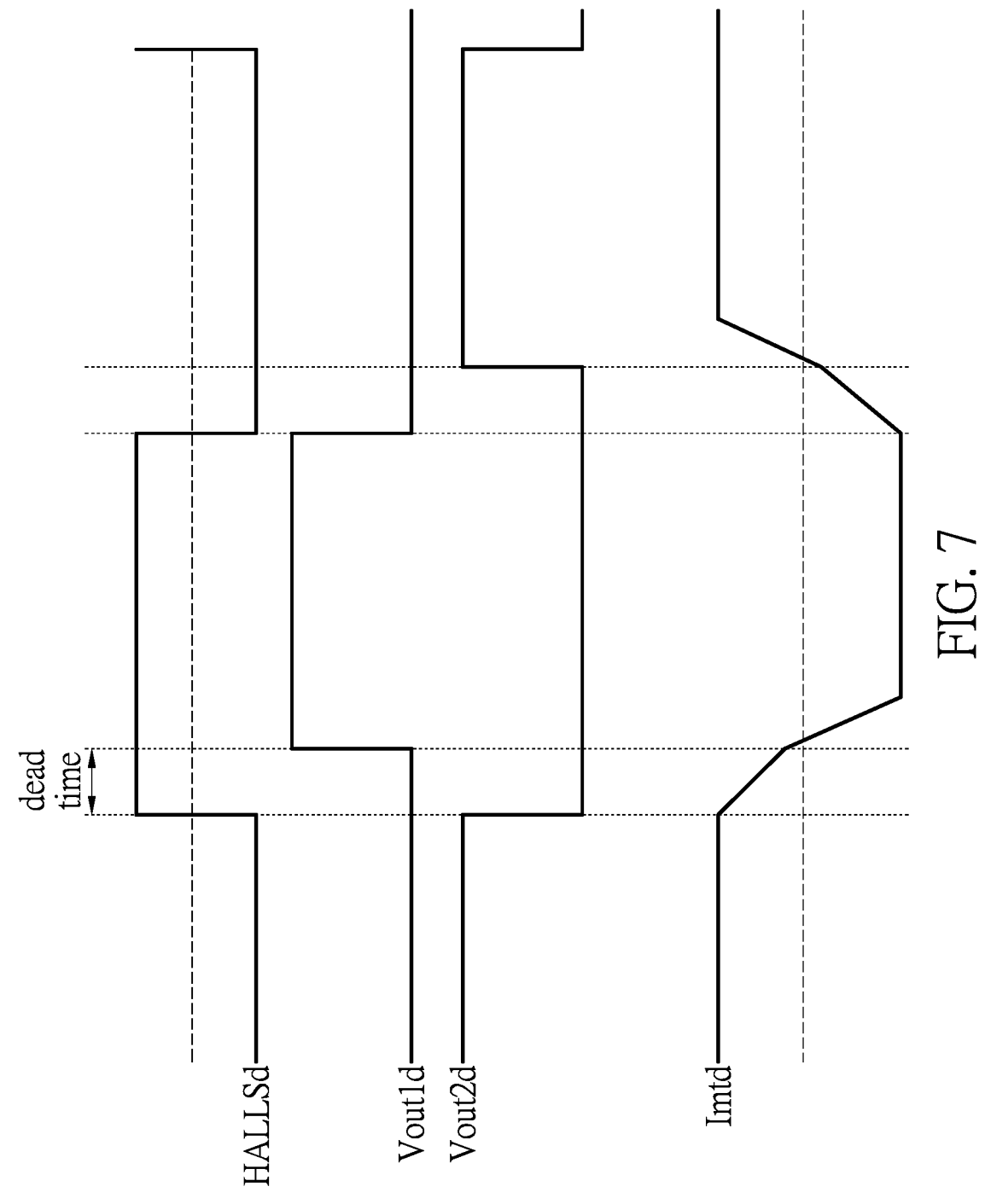
FIG. 7 is a waveform diagram of a motor starting circuit having a dead time setting mechanism according to the second embodiment of the present disclosure.
Figure 8:
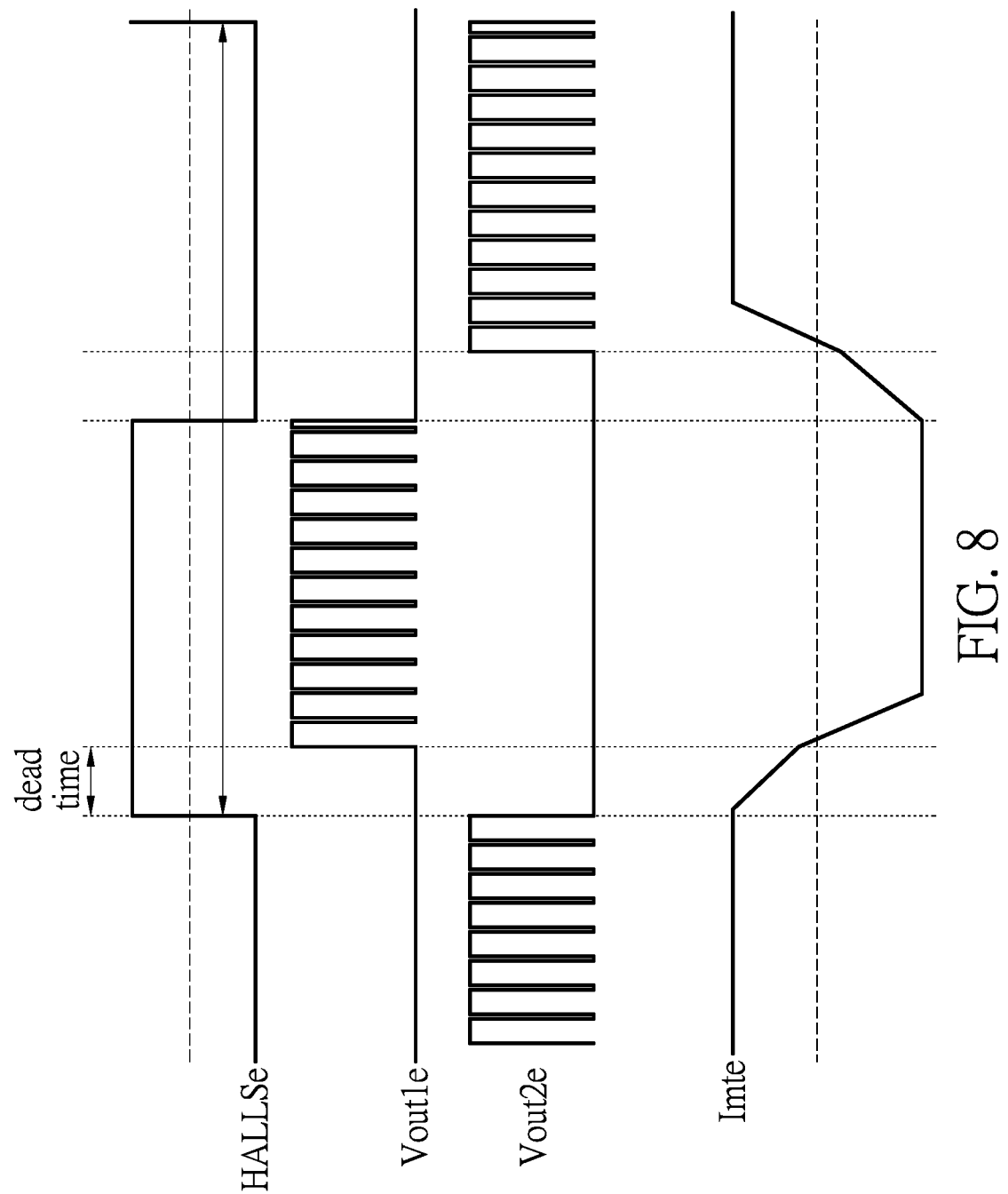
FIG. 8 is a waveform diagram of a motor starting circuit having a dead time setting mechanism according to the second embodiment of the present disclosure.
Figure 9:
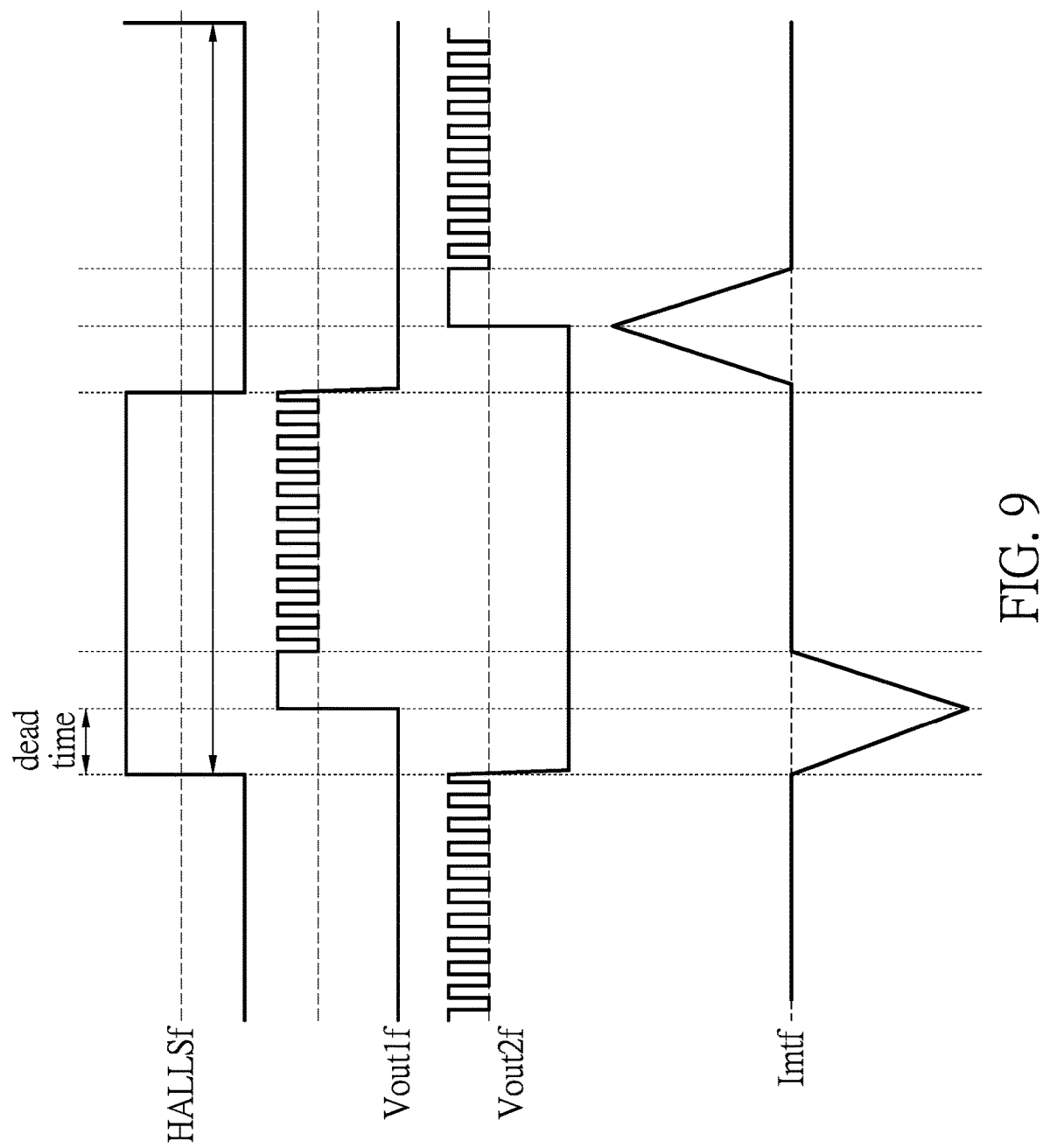
FIG. 9 is a waveform diagram of a motor starting circuit having a dead time setting mechanism according to the second embodiment of the present disclosure.

On the other hand, the rotor position detection circuit RTD detects the position of the rotor of the motor MT to output a rotor position detection signal. For example, the rotor position detection circuit RTD includes a Hall sensor for detecting the position of the rotor of the motor MT to output a rotor position detection signal HALLSa as shown in FIG. 4, a rotor position detection signal HALLSb as shown in FIG. 5, a rotor position detection signal HALLSd as shown in FIG. 7, a rotor position detection signal HALLSe as shown in FIG. 8, or a rotor position detection signal HALLSf is shown in FIG. 9.

The rotational speed detection circuit SDT determines the rotational speed of the motor MT according to a rotor position detection signal received from the rotor position detection circuit RTD, and outputs a rotational speed detection signal SPD.

When a count value indicated by the count signal CTEND received by the start-up commutation selector circuit SLT from the counting circuit CNT reaches a count threshold (for example, a count signal CTEND reaches a high level as shown in FIG. 10), this indicates that the output stage circuit OTG of the motor starting circuit of the present disclosure has started the motor MT to run for a period of time, so that the rotational speed of the motor MT has reached a target rotational speed and the target rotational speed is maintained for continual operation.

When the rotational speed of the motor MT has reached a target rotational speed and continues to operate according to the target rotational speed, the start-up commutation selector circuit SLT can obtain the rotational speed detection signal SPD output by the rotational speed detection signal SDT according to a detected rotational speed of the motor MT during stable operation.

The start-up commutation selector circuit SLT can determine whether or not there is a dead time within a motor start-up time interval according to the rotational speed of the motor MT when the motor MT is running stably, as indicated by the rotational speed detection signal SPD from the rotational speed detection circuit SDT, so as to determine the length and the time point of the dead time and set the commutation time of the motor MT to output the commutation instructing signal DZEN.

When a count value indicated by the counting signal CTEND received by the start-up commutation selector circuit SLT from the counting circuit CNT reaches a counting threshold, the start-up commutation selector circuit SLT can determine whether or not the rotational speed of the motor MT indicated by the rotational speed detection signal SPD is higher than a reference rotational speed SPDREF (as shown in S14 of FIG. 3) to determine whether or not there is a dead time within a motor start-up time interval to output the commutation instructing signal DZEN.

When the rotational speed of the motor MT is greater than the reference rotational speed, the commutation instructing signal DZEN (for example, low level) received by the control circuit CTR from the start-up commutation selector circuit SLT indicates that no dead time is set within the motor start-up time interval (as shown in S15 of FIG. 3), or indicates that the length of the dead time within a motor start-up time interval is less than a dead time length threshold.

If the commutation instructing signal DZEN (for example, low level) received by the control circuit CTR from the start-up commutation selector circuit SLT indicates that no dead time is set within a motor start-up time interval, the voltage signal of the first terminal OUT1 of the motor MT can be the same as the voltage signal Vout1*a* shown in FIG. 4 or the voltage signal Vout1*a* shown in FIG. 5, and the voltage signal of the second terminal OUT2 of the motor MT can be the same as the voltage signal Vout2*a* shown in FIG. 4 or the voltage signal Vout2*b* shown in FIG. 5, and the current signal of the motor MT can be the same as the current signal Imta shown in FIG. 4 or the current signal Imtb shown in FIG. 5.

As shown in FIG. 4, within a motor driving time interval, the voltage signal Vout1*a* of the first terminal OUT1 of the motor MT and the voltage signal Vout2*a* of the second terminal OUT2 of the motor MT change smoothly. In contrast, as shown in FIG. 5, there is a slow-down time within a motor driving time interval (i.e., within the working period of the voltage signal Vout1*a* of the first terminal OUT1 of the motor MT and the voltage signal Vout2*a* of the second terminal OUT2 of the motor MT).

On the contrary, when the rotational speed of the motor MT is not greater than the reference rotational speed, the commutation instructing signal DZEN (for example, a high level) received by the control circuit CTR from the start-up commutation selector circuit SLT indicates to set a dead time within a motor start time interval (as shown in S16 of FIG. 3), or indicates that the length of the dead time within a motor start-up time interval is greater than a dead time length threshold.

Figure 6:
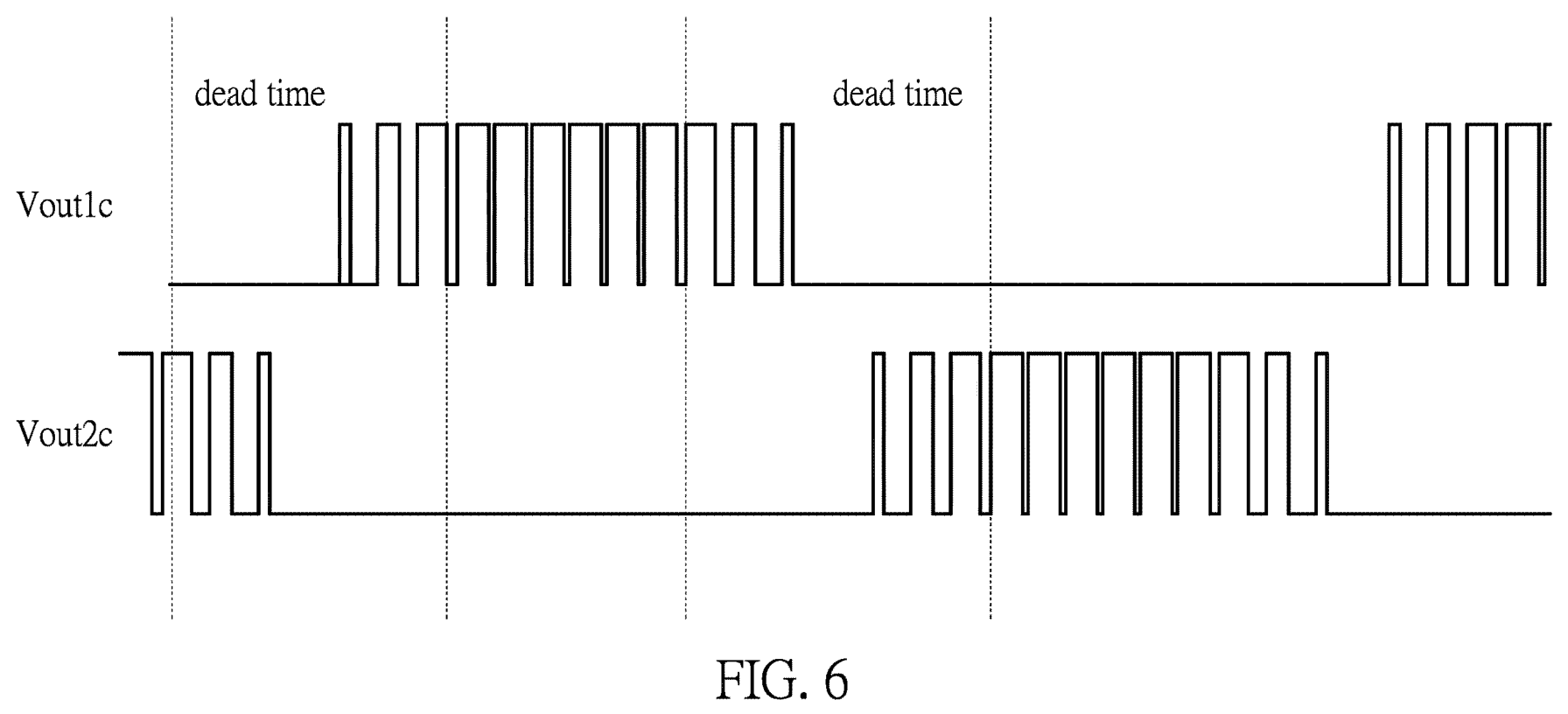

If the commutation instructing signal DZEN (for example, a low level) received by the control circuit CTR from the start-up commutation selector circuit SLT indicates to set a dead time within the motor start-up time interval, the voltage signal of the first terminal OUT1 of the motor MT may be the same as the voltage signal Vout1*c* as shown in FIG. 6, the voltage signal Vout1*d* as shown in FIG. 7, the voltage signal Vout1*e* as shown in FIG. 8, or the voltage signal Vout1*f* as shown in FIG. 9. The voltage signal of the second voltage signal of the second terminal OUT2 of the motor MT can be the same as the voltage signal Vout2*c* as shown in FIG. 6, the voltage signal Vout2*d* as shown in FIG. 7, the voltage signal Vout2*e* as shown in FIG. 8, or the voltage signal Vout2*f* as shown in FIG. 9. The voltage signal of the motor MT may be the same as the current signal Imtd as shown in FIG. 7, the current signal Imte as shown in FIG. 8, or the current signal Imtf as shown in FIG. 9.

The control circuit CTR outputs a plurality of control signals according to the rotor position detection signal received from the rotor position detection circuit RTD and the commutation instructing signal DZEN received from the start-up commutation selector circuit SLT (and a target rotational speed command RPMCMD received from an external target rotational speed command circuit).

The driver circuit DRV outputs a plurality of driving signals to the control terminal of the first high-side switch H1, the control terminal of the first low-side switch L1, the control terminal of the second high-side switch H2, and the control terminal of the second low-side switch L2 of the output stage circuit OTG according to the plurality of control signals received from the control circuit CTR, so as to control the operation of the output stage circuit OTG to start the motor MT.

As mentioned above, the present disclosure provides a motor starting circuit having a dead time setting mechanism. The motor starting circuit of the present disclosure automatically detects the rotational speed of the motor, determines whether or not there is a dead time within a motor start-up time interval according to the rotational speed of the motor, and can set the dead time within the motor start-up time interval. In particular, when the motor is running at a high speed, the length of the dead time is set to be less than a dead time length threshold (for example, zero value) to prevent the motor from having a dead time in the motor start-up time interval, during which a large back electromotive force current will be generated and fed back into the power supply.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor starting circuit having a dead time setting mechanism, comprising:
   a rotational speed detection circuit connected to a motor and configured to detect a rotational speed of the motor to output a rotational speed detection signal;
   a start-up commutation selector circuit connected to the rotational speed detection circuit and configured to determine whether or not there is a dead time within a motor start-up time interval to output a commutation instructing signal according to the rotational speed of the motor indicated by the rotational speed detection signal received from the rotational speed detection circuit;
   a control circuit connected to the start-up commutation selector circuit and configured to output a control signal according to the commutation instructing signal received from the start-up commutation selector circuit;
   a driver circuit connected to the control circuit and configured to output a driving signal according to the control signal received from the control circuit; and
   an output stage circuit connected to the driver circuit and the motor and configured to start the motor according to the driving signal received from the driver circuit.

2. The motor starting circuit having the dead time setting mechanism according to claim 1, wherein the start-up commutation selector circuit determines a length and a time point of the dead time within the motor start-up time interval according to the rotational speed of the motor indicated by the rotational speed detection signal received from the rotational speed detection circuit.

3. The motor starting circuit having the dead time setting mechanism according to claim 1, wherein the start-up commutation selector circuit determines whether or not the length of the dead time within the motor start-up time interval is less than a dead time length threshold according to the rotational speed of the motor indicated by the rotational speed detection signal received from the rotational speed detection circuit.

4. The motor starting circuit having the dead time setting mechanism according to claim 1, wherein the start-up commutation selector circuit determines a motor commutation time within the motor start-up time interval according to the rotational speed of the motor indicated by the rotational speed detection signal received from the rotational speed detection circuit.

5. The motor starting circuit having the dead time setting mechanism according to claim 1, further including:

a rotor position detection circuit provided in the motor and connected to the rotational speed detection circuit and configured to detect a position of the rotor of the motor to output a rotor position detection signal, wherein the rotational speed detection circuit determines the rotational speed of the motor according to changes in a position of the rotor of the motor indicated by the rotor position detection signal received from the rotor position detection circuit.

6. The motor starting circuit having the dead time setting mechanism according to claim 5, wherein the control circuit is connected to the rotor position detection circuit and configured to output the control signal to the driver circuit according to the rotor position detection signal received from the rotor position detection circuit and the commutation instructing signal received from the start-up commutation selector circuit.

7. The motor starting circuit having the dead time setting mechanism according to claim 1, including:
   a first high-side switch, wherein a first terminal of the first high-side switch is connected to a common power supply to receive a common voltage from the common power supply;
   a first low-side switch, wherein a first terminal of the first low-side switch is connected to a second terminal of the first high-side switch, a second terminal of the first low-side switch is grounded, and a node between the first terminal of the first low-side switch and the second terminal of the first high-side switch is connected to a first terminal of the motor;
   a second high-side switch, wherein a first terminal of the second high-side switch is connected to the common power supply to receive a common voltage from the common power supply; and
   a second low-side switch, wherein a first terminal of the second low-side switch is connected to a second terminal of the second low-side switch, the second terminal of the second low-side switch is grounded, and a node between the first terminal of the second low-side switch and a second terminal of the second high-side switch is connected to a second terminal of the motor;
   wherein a control terminal of the first high-side switch, a control terminal of the first low-side switch, a control terminal of the second high-side switch and a control terminal of the second low-side switch are connected to the driver circuit.

8. The motor starting circuit having the dead time setting mechanism according to claim 7, further including:
   a voltage detection circuit connected to a line between the output stage circuit and the common power supply and configured to detect the common voltage received from the first terminal of the first high-side switch and the second terminal of the second high-side switch of the output stage circuit to determine whether or not a detected common voltage is higher than a reference voltage, so as to output a voltage detection signal.

9. The motor starting circuit having the dead time setting mechanism according to claim 8, further including:
   a comparator, wherein a first input terminal of the comparator is connected to the first terminal of the first high-side switch or the first terminal of the second high-side switch, a second input terminal of the comparator is coupled to the first terminal of the first high-side switch, and an output terminal of the comparator is configured to output the voltage detection signal.

10. The motor starting circuit having the dead time setting mechanism according to claim 8, further including:

a counting circuit connected to the voltage detection circuit and configured to perform counting to output a counting signal when the common voltage received by the output stage circuit from the common power supply is determined to be higher than the reference voltage according to the voltage detection signal received from the voltage detection circuit.

11. The motor starting circuit having the dead time setting mechanism according to claim 10, wherein, when a count value indicated by the counting signal received by the start-up commutation selector circuit from the counting circuit reaches a counting threshold value, the start-up commutation selector circuit determines whether or not there is the dead time within the motor start-up time interval according to a current rotational speed of the motor indicated by the rotational speed detection signal to output the commutation instructing signal.

12. The motor starting circuit having the dead time setting mechanism according to claim 10, wherein, when a count value indicated by the counting signal received by the start-up commutation selector circuit from the counting circuit reaches a counting threshold, the start-up commutation selector circuit determines whether or not the rotational speed of the motor indicated by the rotational speed detection signal is higher than a reference rotational speed to determine whether or not there is the dead time within the motor start-up time interval.

13. The motor starting circuit having the dead time setting mechanism according to claim 12, wherein, when the rotational speed of the motor is greater than the reference rotational speed, the commutation instructing signal received by the control circuit from the start-up commutation selector circuit indicates that the dead time is not set within the motor start-up time interval.

14. The motor starting circuit having the dead time setting mechanism according to claim 13, wherein, when the rotational speed of the motor is not greater than the reference rotational speed, the commutation instructing signal received by the control circuit from the start-up commutation selector circuit indicates that the dead time is set within the motor start-up time interval.

15. The motor starting circuit having the dead time setting mechanism according to claim 12, wherein, when the rotational speed of the motor is greater than the reference rotational speed, the commutation instructing signal received by the control circuit from the start-up commutation selector circuit indicates that a length of the dead time within the motor start-up time interval is less than a dead time length threshold.

16. The motor starting circuit having the dead time setting mechanism according to claim 15, wherein, when the rotational speed of the motor is not greater than the reference rotational speed, the commutation instructing signal received by the control circuit from the start-up commutation selector circuit indicates that the length of the dead time within the motor start-up time interval is greater than the dead time length threshold.

* * * * *